Oct. 10, 1967  S. C. RETHORST  3,345,951
AUTOMOTIVE-MONORAIL TRANSPORTATION SYSTEM
Filed Jan. 4, 1965  3 Sheets-Sheet 2
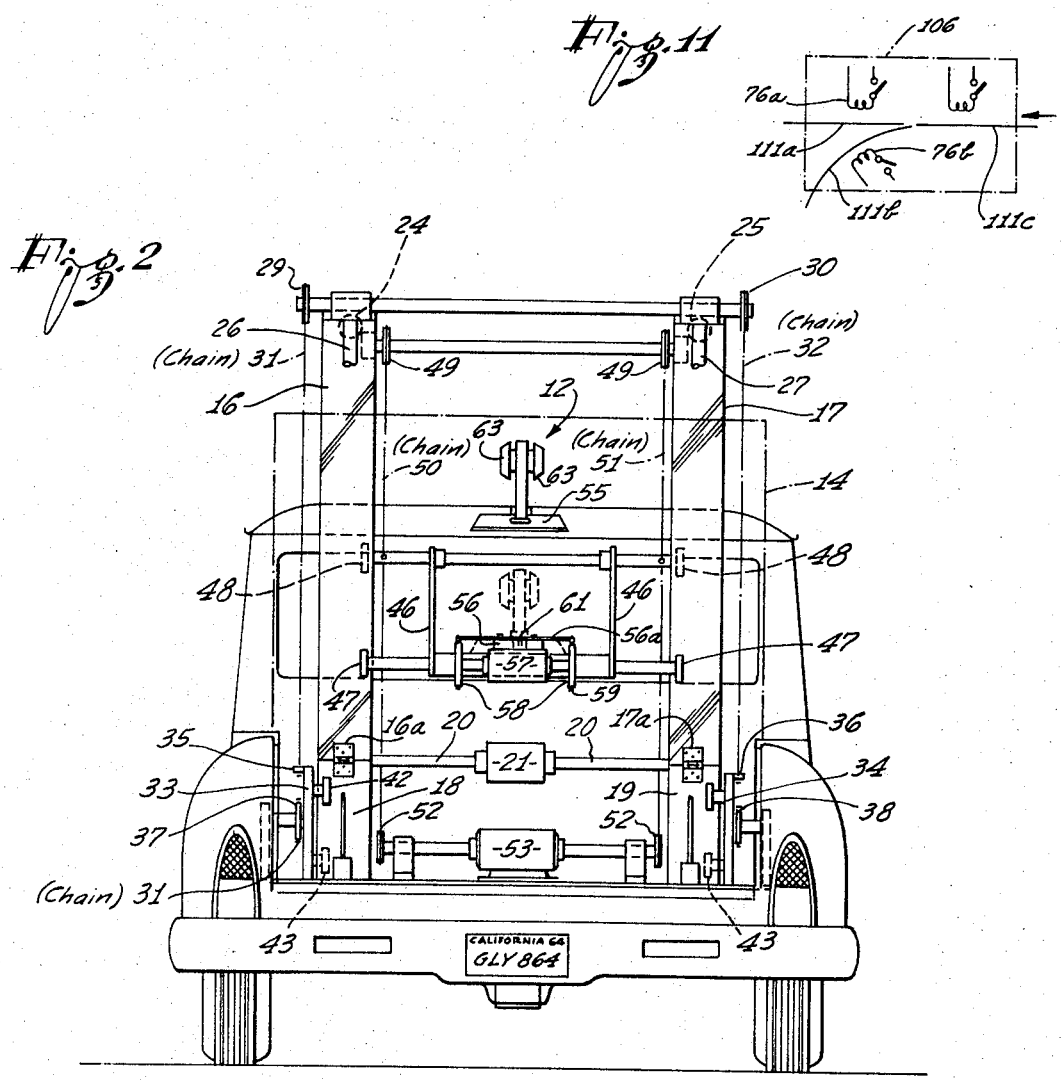
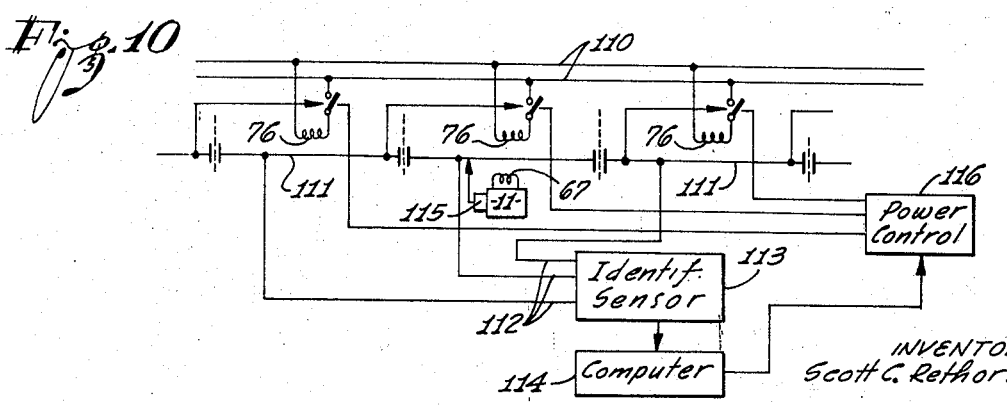
INVENTOR:
Scott C. Rethorst
Attorneys Oct. 10, 1967  S. C. RETHORST  3,345,951
AUTOMOTIVE-MONORAIL TRANSPORTATION SYSTEM
Filed Jan. 4, 1965  3 Sheets-Sheet 3
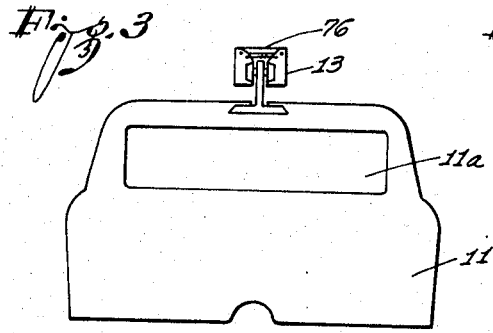
Fig. 3
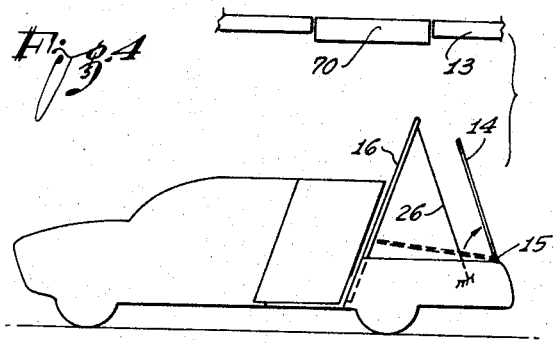
Fig. 4
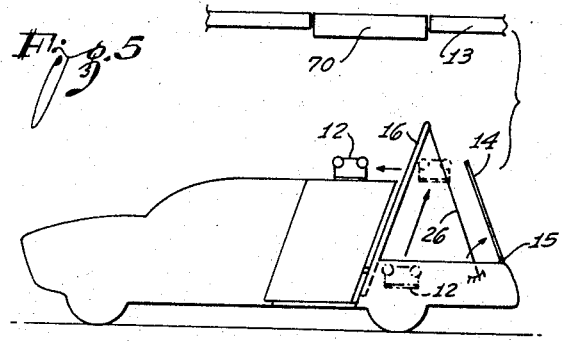
Fig. 5
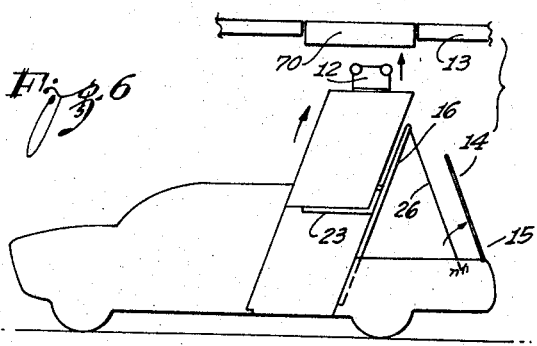
Fig. 6
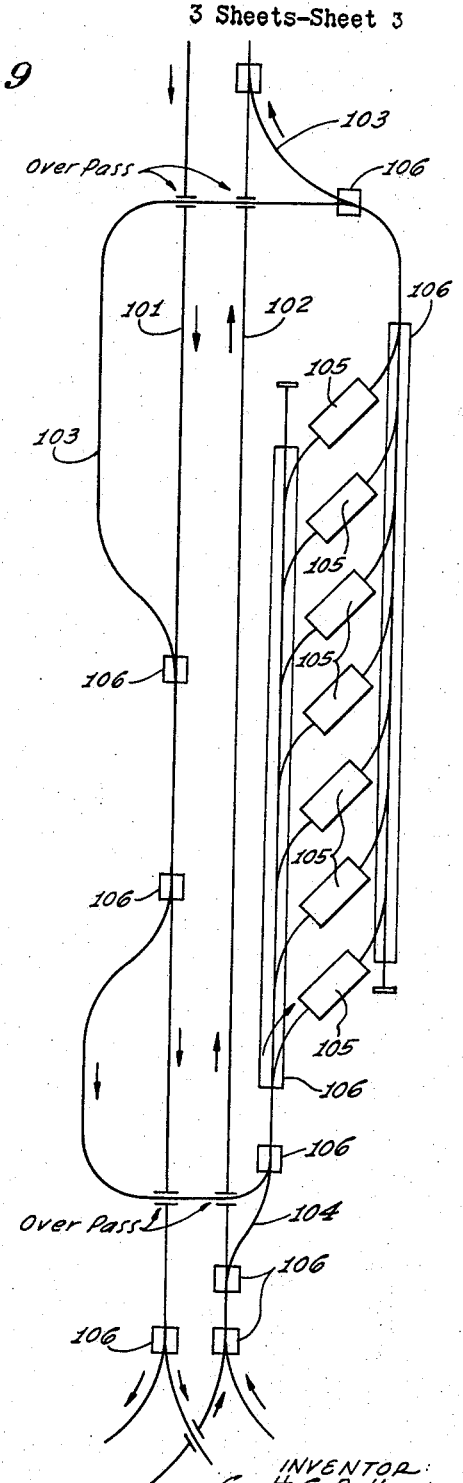
Fig. 9
INVENTOR:
Scott C. Rethorst
By Smyth, Roston & Pavitt
Attorneys

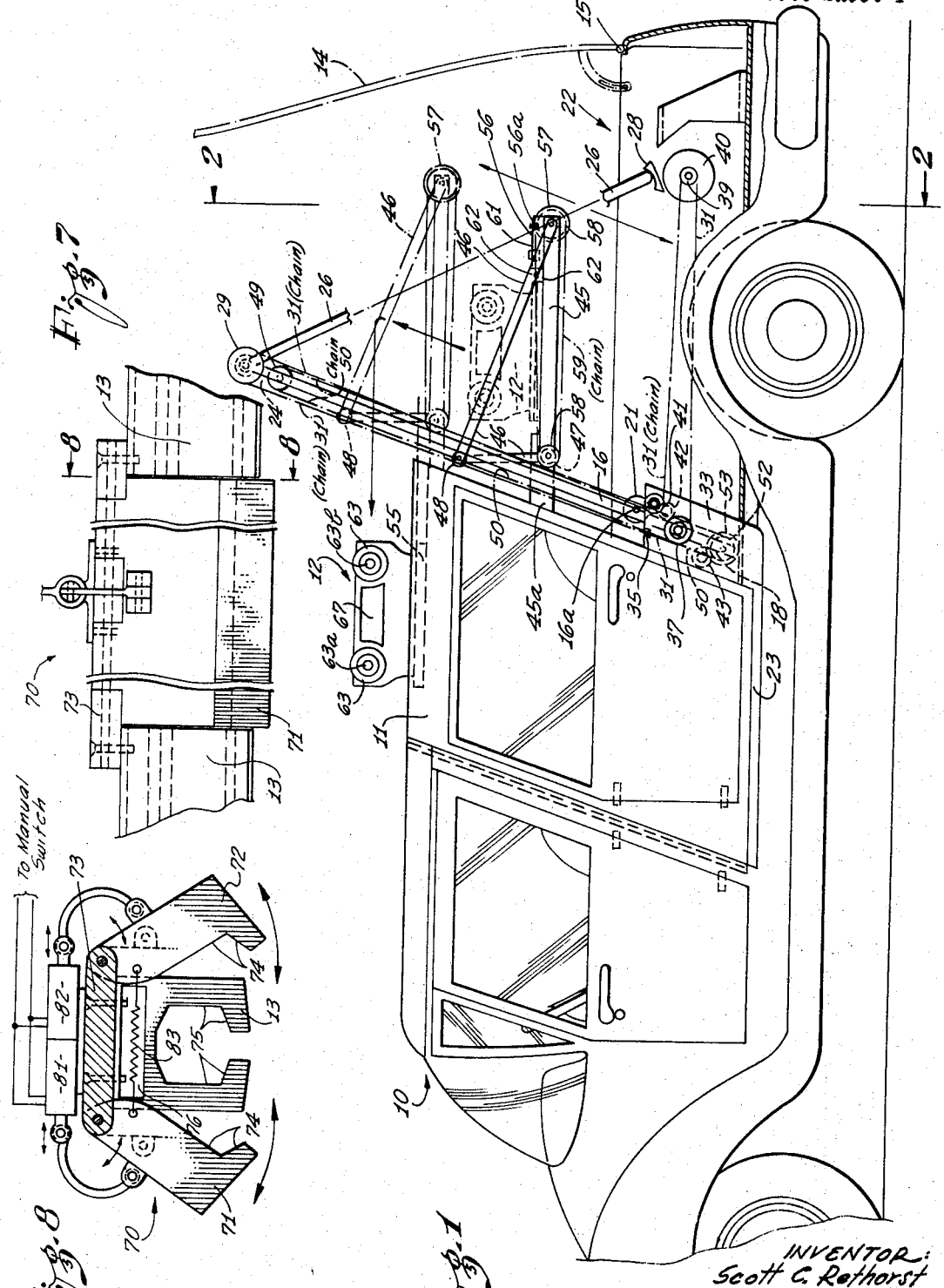

United States Patent Office 3,345,951
Patented Oct. 10, 1967

3,345,951
AUTOMOTIVE-MONORAIL TRANSPORTATION SYSTEM
Scott C. Rethorst, 1661 Lombardy Road, Pasadena, Calif. 91106
Filed Jan. 4, 1965, Ser. No. 423,065
10 Claims. (Cl. 104—91)

The present system relates to a system of transportation in which a capsule containing goods or passengers is arranged alternatively as an integral part of an automobile or on a monorail system.

More particularly the invention relates to a passenger carrying capsule which is designated to provide at least one of the regular passenger seats of a conventional automobile, with the feature that this capsule may be removed from the automotive chassis and transported over a monorail system.

The limitations and inadequacies of present day mass transportation systems are well known. These limitations of public transportation systems have encouraged the development and extensive use of private transportation systems based on private automotive vehicles.

The congestion resulting from the extensive use of private automobiles, however, to a large extent defeats their usefulness as a convenient mass transportation system in metropolitan areas. In spite of this limitation of the private automobile, its convenience in going wherever the operator desires to go, whenever he wants to go, independent of specified routes and stops or stations, has led, and will continue to lead, to greater and greater reliance upon the automobile, because it provides independent transportation.

Public mass transportation, lacking these qualities, irrespective of its inherent efficiencies due to bulk transport, and in case of rail transportation routes avoiding congestion of private automobiles, has suffered, and is likely to continue to suffer, a progressive decline in use.

These facts are well known. They are outlined in many articles on this subject. The October 1959 Fortune, on page 112, projecting Detroit's next decade, details why the private automobile is destined to increase in numbers and at the same time increase congestion. A companion article on page 115 of the same Fortune issue, entitled, "The Long Decline of Public Transportation," details the other side of this coin.

It is clear that what is needed is a rapid mass transportation system which will contain the virtues of independent transportation such as is provided by the private automobile; namely, its independence of predetermined and fixed routes, stops and schedule, and which retains at the same time the virtues of public transportation; namely, its economics of bulk transportation and its ability to avoid the congestion resulting from the numbers of private automobiles, which exceed the capacities of highways, particularly in metropolitan areas, to accommodate and handle the same, and the capacities of parking areas at the desired destinations in such areas.

It is an object of my present invention to provide an integrated system in which public transportation facilties with their inherent advantages may be utilized, in conjunction with privately operated vehicles. This object is attained in my preferred embodiment by employing a capsule which will fit onto a standard automotive chassis, which capsule may be simply removed from the automotive chassis and travel as an independent powered unit on a conventional monorail system. The transportation system provided thereby will contain all of the present characteristics of independent transportation inherent in the automobile, and to a large degree extend these characteristics of independent transportation to the monorail system in such a manner as to avoid the downtown congestion normally associated with the private automobile in providing independent transportation.

A further object of the invention is to provide a capsule consisting of the standard rear seat of an automobile, together with its immediate surrounding structure. The capsule will thus consist of the rear seat of the automobile, the floor under the rear seat, a panel forward of this rear seat with a glass windshield, roof, panel back of the rear seat, and standard automotive side doors. Thus it is an enclosed capsule, sealed on all sides, with sides and front windshield like an automobile. This capsule fits into the automotive body between the front seat and the trunk compartment, so that when installed the automobile is of standard form.

A still further object of the invention is to provide this capsule with a simple roof attachment so that it might be attached to and transported as an independent unit on the monorail system, this roof attachment device containing an electric powered magnetic element for monorail travel. The roof attachment element may contain wheels for motion on the monorail, or many contain an air bearing for pneumatic sliding motion.

It is of advantage to provide this capsule in such a form that it may contain a writing and working surface so that the commuter can use it as a desk while in transit, and so that it may be run into offices in its downtown terminal destination and used as a working desk by the commuter on his job. For such use the top and windows, both side and front, would be retracted. If it is not desired to use the capsule as a desk at destination, it may be parked say on overhead rails over automotive parking lots.

Still another object of the invention is to enable not only capsules, but entire automobiles, although preferably of the smaller variety, to be transported on the monorail system in the same manner as the lighter weight capsules. Such transportation would enable the automobile on arriving at its destination on the monorail to be used for further peripheral travel on the road and highway system.

Finally, another object of the invention is to provide a monorail track wherein the independent traffic, such as that described above as in the case of capsules, may be supplemented by public monorail trains and piggyback freight pods, i.e., containers permiting suspension from the monorail track as well as loading on the platform of a track. This breadth of operation will provide greater utility of traffic on the monorail system. The piggyback freight pods in particular, consisting of freight pods brought to the monorail track—say by truck beds—can be transported over the monorail system during the night and off-peak hours—say for the purpose of bringing vegetable produce into central market areas.

The foregoing and other readily apparent features of my present invention will be better understood by reference to the following more detailed specifications and accompanying drawings, in which:

FIGURE 1 is a side elevation view of the preferred embodiment of my invention providing an automotive-monorail transportation system incorporating features of the present invention, and showing also the capsule to be removed from an automobile for attachment to the monorail;

FIGURE 2 shows a rear, partially sectional view of the same automobile particularly exposing the interior of the trunk thereof;

FIGURE 3 is a front view of the capsule of FIGURE 1, showing its suspension from the monorail;

FIGURE 4 is a side elevation view of the automotive-monorail transportation system of FIGURE 1, showing the first step of the sequence of transferring the capsule from its automotive chassis to the monorail, wherein the automotive trunk lid is raised and the capsule supporting-arms are extended;

FIGURE 5 is a similar side view, showing the second step of said sequence, wherein the electric power and suspension package is hoisted up along the supporting arms, and locked in position on the roof of the capsule;

FIGURE 6 is a similar side view, showing the third step of said sequence, wherein the shelf upon which the capsule rests is drawn up the support arm, raising the capsule into position for attachment to the monorail;

FIGURES 7 and 8 show side and sectional view through a loading section of the monorail system permitting the capsule to be attached to or removed from the monorail systems;

FIGURE 9 illustrates schematically a portion of a monorail track portion, particularly a suburban loading terminal with feeder rails to a general monorail system; and FIGURES 10 and 11 illustrates schematically how the advance of a capsule along the monorail can be controlled.

In the drawings, like numerals refer to like or corresponding parts throughout the several views.

Referring to FIGURES 1 and 2, there is illustrated an automotive-monorail transportation system consisting of an automotive chassis 10, comprising the conventional elements of an automobile, and having its rear seat constructed as a capsule 11. This capsule 11 has its own floor separable from the floor of the car; it has a front panel with windshield 11a (see FIGURE 3) and a complete rear panel. The sides of capsule 11, of course, have doors and are parts of the automobile, but to be removed therefrom with the capsule. Thus, the capsule though being a part of the automobile 10, and fitting flush into the overall configuration thereof, still forms a complete independent, separable and enclosed unit. On the roof of capsule 11 may be mounted an electric power package 12 adapted for attachments to a monorail track system 13. The capsule 11 when incorporated in the automobile, is disposed upon a shelf 23 which is elevatable in a manner hereinafter described.

FIGURE 1 shows the trunk lid 14 swung up about its rear hinge 15 permitting the supporting arms 16 and 17 to swing up about their hinges 16a and 17a from their retracted position in the trunk 22. The arms 16 and 17 when erected are flush with rails 18 and 19 respectively to form an extended guide path. An electric motor 21 with shaft 20 pivots arms 16 and 17 into the erected position when needed. Solenoids 24 and 25 respectively unfold rods 26 and 27 to rest into beds such as 28; these rods lend stability to the arm structure.

The tops of the arms respectively journal sprocket wheels 29 and 30. These sprocket wheels are idlers that positively follow and advance movement of sprocket chains 31 and 32. These chains are respectively attached to shelf frames 33 and 34 integral with or geared to shelf 23. Studs 35 and 36 serve as anchor parts for the chains, which respectively run over idler sprockets 37 and 38 and from there to drive sprockets mounted on a shaft 39 for common transport by a reversible motor 40.

The paths of the chains 31 and 32 are reversed and run over a second set of idler sprockets (only one thereof, 41 being shown in FIGURE 1) to return to the top sprockets 29 and 30, respectively. The motor 40 thus is capable of driving the frames 33 and 34 with shelf 23 up and down, and the capsule 11 when seated on the shelf follows this lifting or lowering motion.

The frames 33 and 34 each have upper wheels such as 42 which run on the underside of arms 16 and 17, while lower wheels 43 of the frames run on the upper sides of arms 16 and 17. Due to cantilever action of the weight on shelf 23, a torque is produced acting, in FIGURE 1, in counter-clockwise direction. Thus wheels 42 and 43 are always in engagement with the respective arm on which they run.

Arms 16 and 17 additionally serve as guiding elements for a platform 45 with the aid of which the monorail suspension and power package 12 can be lifted out of the trunk 22 for positioning on top of capsule 11. When the capsule is a part of the car, the package 12 rests on platform 45 which is then in the trunk. In order to facilitate illustration, the platform 45 is shown in partially lifted position.

A frame 46 supports a pair of lower wheels 47 and a pair of upper wheels 48. The lower wheels run on the underside of arms 16 and 17, the upper wheels on the upper sides of the arms. A pair of upper sprockets 49 near the top of arms 16 and 17 respectively guide sprocket chains 50 and 51 suitably anchored to frame 46 and reversed by drive sprockets 52. Sprockets 52 are driven from a motor 53, which is also of the reversible type.

Thus, by turning motor 53 on, platform 45 can be lifted from the storage position in trunk 22 up to almost level with the top of capsule 11 (see dotted position in FIGURE 1). The roof of capsule 11 has a slot having an inverse T-shaped cross section for receiving the T-shaped supporting structure 55 of package 12. The upper position of platform 45 is selected so that its top surface is aligned with the bottom of this slot in the roof of capsule 11. A guide 45 with T-shaped cross section and pertaining to platform 45 is then aligned with the T-slot in the roof of capsule 11 to permit placement of package 12 from the platform 45 into the slot or vice versa.

The shifting motion for the package 12 is carried out by a ram 56 driven by a reversible motor 57 via sprocket and chain arrangement, there being four sprocket wheels 58 and two chains 59. Ram 56 is anchored to chains 59 by a bar 56a. The ram must be long enough to push package 12 into the position illustrated. This position is defined that a vertical plane running centrally in between the two shafts 63a and 63b of package 12, also runs through the center of gravity of the capsule 11.

On top of ram 56 there is a linear actuator 61 having a front hook 62 permitting to grip a loop in package 12 to pull it out of the T-slot in the top of capsule 11 so that the package 12 can be placed onto the platform 45 for placing the package back into the trunk 22 of the car.

It should be mentioned that the three motors 21, 40, and 53 are shown and described as an example to illustrate the carrying out of the three important steps: erecting the frame, raising the power package and lifting the capsule. There may be provided a single motor and a variable clutch and transmission arrangement connecting the several driving gears to this motor to establish different torque transmission paths respectively for frame erection and shelf and platform lifting. As can be seen, the three motors illustrated have parallel shafts which facilitates the integration of the drives. Furthermore, it is possible to use the car's engine and a special transmission actuated when the car's transmission is in "neutral."

When electric power is used, the motor may selectively be connected electrically to the generator of the car, the drive gear of the car is shifted in neutral and the car's engine now provides power to the generator to drive the several motors. The control of the car's engine may provide for the speed control, but electrical limit switches may serve to turn the electric power off whenever any of the elements has arrived in the desired position.

The package 12 itself is comprised of the T-shaped supporting structure 55 and four bevelled wheels 63 permitting the package to run in the monorail 13. The wheels are arranged in coaxial pairs, there being a front pair and a rear pair of wheels with an armature 67 in between. This armature can be considered the moving part of a linear motor, while coils 76 in the rail 13 provide for stator operation to propel the armature with T support 55 and the entire capsule 11 when suspended from package 12, along the rail path.

FIGURE 3 illustrates the capsule 11 as seen in a front view wherein the roof-mounted electric power package 12 connects the capsule 11 with the monorail 13.

The detailed sequence of these events in transferring the capsule from its position in the automobile to that on the monorail is best illustrated by the set of FIGURES 4-8.

FIGURE 4 illustrates the first step in this sequence; namely, that of raising the trunk lid 14 about its hinge 15, thereby permitting motor 21 to pivot arms 16 and 17 into the erected position. The stiffening rods 26 and 27 may then be unfolded by actuating solenoids 24 and 25.

FIGURE 5 illustrates the second step in this sequence wherein the electric power package 12 is raised from its lower position in the trunk 22 along the supporting arms 16 and 17 and onto the roof of capsule 11 to its roof-mounted position. This requires, first, actuation of motor 53, and thereupon the chains 50 and 51 lift platform 45 out of the trunk 22; the package 12 being seated on the platform. Wheels 47 and 48 reel and guide the platform with frame 46 along the erected arms 16 and 17. When the platform 45 is aligned with the roof of capsule 11, the motor 57 is started to drive ram 56 thereby pushing the T-section 55 of package 12 into the slot in the roof of capsule 11. The ram 56 is thereafter retracted just enough to clear the capsule. The ram does not have to be retracted completely to its rearmost position since later on the package 12 will have to be pulled out again from the slot when the capsule has returned to its homing station.

FIGURE 6 illustrates the third step of this sequence, wherein the shelf 23 rolls up along the supporting arms 16 and 17 raising the capsule 11 with its roof-mounted power package 12 into position for attachment to the monorail 13. This, of course, is done by energizing motor 40 driving chains 31 and 32 to pull frames 33 and 34 up, thereby the shelf 23 with capsule 11 is lifted out of its "homing" position in the car and into a position permitting suspension of the assembly 11-12 to monorail 13. The loading point within the monorail system is specifically defined by an interruption in the monorail 13 as shown in FIGURE 7. This gap is covered by a loading section 70 which may bridge the gap but can also be pivoted away to permit insertion of a power package 12. Thus, there are two brackets 71 and 72 pivotally mounted on a rail bar 73. The brackets 71 and 72 are profiled at 74 to flush with the profile 75 of the rail 13, provided brackets 71 and 72 are pivoted into their vertical positions (see arrows).

For loading as well as unloading the brackets 71 and 72 are in the illustrated position of FIGURE 8, permitting insertion of the power package 12 from below until wheels 63 thereof are flush with profile 75. The brackets 71 and 72 are then pivoted back so that profiles 74 are aligned with profile 75. When now the shelf 23 is lowered again, the wheels 63 are suspended by the brackets 71 and 72 and the entire capsule 11 now hangs on this structure and becomes a part of the monorail system.

The two brackets 71 and 72 are, for example, operated by solenoids 81 and 82 for spreading or closing. The solenoids may be operated by a switch hanging down on a cable which the passenger of capsule 11 may reach through the window. When the solenoids 81 to 82 are deenergized the brackets 71 and 72 are kept by a spring 83 in the downward position to provide an uninterrupted rail path. Spring 83 serves to maintain this position but solenoids 81 and 82 when energized overcome this spring bias.

During loading, the power package 12 proceeds upwardly (FIGURE 6), the spring-loaded halves 71 and 72 have been opened by energizing the solenoids. After package 12 has entered the open space in between the brackets 71 and 72, the solenoids are deenergized thereby locking the power package into a position of suspension from the monorail. The capsule may then move forward on the monorail, leaving the shelf 23.

The next step in this sequence, not illustrated, is that the shelf 23 may be lowered on its supporting arms 16 and 17 by reversing motor 40. The rods 26 and 27 are then unfolded by actuating solenoids 24 and 25, and arms 16 and 17 are then swung down to their retracted position in the trunk 22 by reversing motor 21, the trunk lid 14 is then lowered and locked, thus restoring the automobile to an independent operable condition, leaving the capsule 11 suspended independently by its electric power package 12 from the monorail 13 ready for monorail operation.

To return the capsule 11 from the monorail 13 to the automotive chassis 10, the sequence of steps described above are reversed. Essentially, the automobile returns to its loading position, and raises its shelf 23 to receive capsule 11. The capsule 11 may at that point have a position somewhat laterally deflected from the chassis of the car. In order to offset such misalignment, the bar 73 may be positioned movable in lateral direction. After the capsule has attained the desired position above the automobile, and after shelf 23 has been lifted (the frame 10-17-26-27 has been erected in the meantime), so that the surface of shelf 23 engages the bottom of capsule 11, solenoids 81 and 82 will be actuated to spread brackets 71 and 72 apart, and the capsule is freed from the monorail. Then shelf 23 with capsule 11 is lowered into the automobile.

Next the platform 45 is raised, ram 56, and linear motor 61 advances for hook 62 to grip the loop and package 12 which then is pulled out of the roof slot of the capsule and onto platform 45. The platform with package is lowered subsequently thereto. Stiffening rods 26 and 27 are folded back, arms 16 and 17 are pivoted back by motor 21, lid 14 is lowered and car is complete again.

Having described the details of construction of my improved transportation system, the operation thereof is believed to be clearly apparent. A commuter has the independent option of transporting himself in his enclosed capsule either as part of his own private automobile, or as an independent capsule on the monorail system. He is limited in his use of the vehicle as an automobile only by the available highway and road system, and he is limited in his operation on the monorail system only by the availability of track and terminal handling facilities.

The monorail elements include a track, a power system, and a control system. In the main, capsules will be privately owned and brought to the monorail by the commuter in a manner outlined above.

The custom monorail system envisaged here is directed primarily toward independent transportation involving the use of private capsules. As a secondary feature, however, the monorail system can accommodate publicly owned capsules or trains. Also "piggy back" truck pods, for hauling freight may be used, on a low priority basis, to achieve better utilization of the system during off rush hours.

The monorail tracks may be built on freeways, radially coming in to the downtown area of a city, from the suburban areas. The downtown service area of the monorail system would be in the form of a loop, with radial lines coming into it. Each monorail would have two rails, one inbound and one outbound. These rails may well run above streets.

The power provided for the monorail may be mechanical, pneumatic, or electrical. A mechanical system may consist of a moving cable similar to a ski lift. A pneumatic system might utilize tubes similar to those used for communication in department stores. The electrical system would consist of a flat linear electric motor as described. Any such system would be feasible, but the electrical system is preferred since it provides optimum control and economy in high density traffic.

For this purpose, the power packages such as 12 each have an armature 67 cooperating with linear stator sections 76 embedded in the rail system and being suitably powered.

FIGURE 9 illustrates a suburban loading station in which the events transpire of the type described in detail above. This suburban station lends itself to the basic description of the entire system.

There are two main or fast tracks 101 and 102, one for each direction, there are branch or approach way or acceleration tracks 103 for feeding capsules into the main tracks, and there are deceleration tracks 104 for slowing down capsules side tracked from the main tracks. Acceleration tracks 103 are fed with capsules for loading track sections 105 being connected to the return or deceleration tracks 104. The track sections 105 each are equipped with loading means as outlined above with reference to FIGURES 7 and 8. Thus, at each of the loading sections the events will transpire as outlined above with reference to removing a capsule from an automobile or returning it thereto. There are a number of switching type elements 106 combining or dividing tracks or rail.

For moving capsules out of the loading area into the main tracks and therealong, a system can be employed outlined best with reference to FIGURE 10. Here it has to be considered that each capsule is not equipped with a complete driving system but only with an armature 67 to complete a linear motor with stator coils 76 in the rail system. Power will be drawn from main cables 110 running along all of the monorail track system 13, being, for example, mounted on top or at the sides of the monorail.

As shown schematically in FIGURE 10, the power is applied to the system of stator coils 76 in sections. Each such track section is further equipped with signal wires 111 extending over the length of the respective section, but the signal wire of each section is insulated from the signal wire of the preceding and succeeding sections. Each section signal wire is the terminus of a signal cable 112, there thus being as many signal cables as there are sections throughout the entire rail system. Each signal cable 112 terminates in the identification sensing system 113 which is the input device of a central computer 114. Each capsule 11 is additionally equipped with a signal box 115 which, for example, issues cyclically a signal transmitted via a guide 116 into the respective wire 111, which signal then is transmitted into output cable 112, and to sensing device 113. Thus, the computer receives a signal (1) identifying the section within the monorail system occupied by a capsule and (2) if this signal issued by box 115 is an identification code in form of a binary, serial-by-bit code for the specific capsule (such as license number or the like), the computer is enabled to keep track of any capsule so identified. Energization of each section, i.e., of the stator coil 76 in each section, is controlled by the output power control section 116 of the central computer 114. Basically the computer 114 process status signals of each section, i.e., whether or not and which capsule is in any section. The respectively succeeding section of any energized and capsule-containing section will be energized provided it does not contain a capsule.

FIGURE 11 illustrates that at a switching section such as 106 selective continuation of movement of a capsule may be controlled by selection of stator coils 76a or 76b. The monorail proper may in addition be equipped with conventional switching elements to insure that the wheels of the power package on any capsule are guided into the proper direction.

Thus, the entire control depends on programming the computer to advance the capsules with sufficient safety, i.e., unoccupied sections in between capsules traveling on the same rail; additionally each capsule may be identified by a code so that the computer can track each capsule to its destiny. Since in effect the entire monorail system comprises main tracks such as 101 and 102, loading and unloading stations such as shown in FIGURE 9, and parking stations permitting storage of capsules, the programming of the computer requires the assembly in a program of specific switch section 106 (see FIGURE 11), to guide a capsule from one loading or parking station to another remotely positioned loading or parking station which is between switching section advance control of any sections is made dependent on occupancy only. The following description is in effect a description of such programming. The commuter drives his automobile to a "parking lot" 105 along the monorail system and parks at a specific point, which is either rented exclusively to him, or is on a first come, first served basis like a parking meter arrangement.

When a commuter wants to go somewhere on the monorail in his capsule, he inserts his "key," which is like a metal IBM punched card, with a specific destination or address on it (e.g., his office when outgoing—his parking lot when returning). This "key" may include also the identification code of the capsule. The signal box 115 may thus be actuated by the "key" to continuously signal the content of the card to the computer. Any conventional card reading and signalling device will serve for this purpose. This information on the "key" is then the input to the computer 114, which controls automatically the routing of the capsule to his destination.

The electronic control system deals with two variables, first the force to accelerate and move the capsule along the track, and second, switching from the main track to side tracks. Each track section—or address—along the tracks is of course identified (wires 111-cables 112), and the control system feeds capsules out from their originating points into such addresses by permitting capsules to enter main tracks such as 101 or 102 from acceleration tracks such as 103. The addresses themselves would move like the block system. Thus, after the commuter puts his "key" into the "IBM Slot" the rest of the operation is automatic.

The computer upon receiving the destination code of the capsule assembles a program by identifying instructions for specific switching sections such as 106 in FIGURE 11. Such instruction reads, for example, "when capsule (follows code) enters section 111c (follows code) turn on coil 76b of section."

The capsules will be switched off automatically to the proper office terminal. These terminals consist of side rails built over conventional present day parking lots adjacent to office buildings. The capsule is parked for the day on its overhead rail, thus independent of the ground automobile parking lot system.

These capsule parking arrangements could either provide commuter access to the point where they are parked, or they could on signal be run by a loading platform which might, for example, be on ground level.

The essential idea of this system is a provision for all of the flexibility of routing and scheduling now available in the private automotive transportation system. Thus, private capsules would have first priority on the monorail. This priority merely means that routine commuting during prescribed rushed hours would be provided with a clear track, unimpeded by non-critical traffic such as freight.

Public capsules may be provided, similar to the private capsules in that they offer the same schedule flexibility. They would not, however, provide the automotive conversion capability. These publicly owned capsules would be to the monorail as taxies are to present day street travel. The capsules would be available at various terminals and can be coin operated or on a dialing basis. The operation of public trains over the same monorail system can be accomplished with no particular priority problem, since the number of vehicle bodies available to public train operation would require and permit only intermittent train service. The degree of utilization of the system by capsules and public trains perhaps would not be subject to accurate forecasting initially. However, the compatibility of the system proposed would resolve this question, and public trains can be introduced into the system only in such volume as would be needed.

The present system of piggyback pods or trailer trucks now used jointly on trucks and railroad flatcars can be extended to this monorail system. It is readily apparent, that the capsule 11 described above is basically independent from its content—freight or people. Thus, piggyback pods can be brought by trucks or rail to designated monorail points and loaded on a side rail and left unattended for automatic delivery at off-peak hours by monorail. Freight will be excluded from the system during the commuter rush hours, but will be encouraged during the off-peak hours. This presents no problem, as freight normally is delivered to downtown or decentralized areas at times which usually coincide with off-peak commuting hours.

The invention is not limited to the embodiment described above, but all changes and modifications thereof not constituting departure from the spirit and scope of the invention are intended to be covered by the following claims:

What is claimed is:

1. A transportation system comprising rail means for transporting vehicles and including transmission means for transmitting energy to any point along the rail means; an automotive vehicle adapted to be operated independently of, and apart from any rail means; a portion of said vehicle being further constructed to carry a load and including means to operate said portion on and in conjunction with said rail means, said automotive vehicle being operable as self-propelled vehicle with and without attachment of said portion, said portion and the said means each having a means complementing each other for propelling the portion of the vehicle, means so that the said portion may be operated alternatively on said rail system, or be placed on said automotive vehicle.

2. A transportation system comprising: a monorail extending between a plurality of stations and including means for the transmission of energy to any point along the monorail; an automotive vehicle adapted for operation independently of, and apart from any rail system including said monorail; a portion of said vehicle being constructed as detachable capsule to carry a load and including means so that said capsule may be attached to said monorail for operation thereon, said motor vehicle being operable as a self-propelled vehicle with or without attachment of said capsule, said capsule and the monorail each having means complementing each other for propelling the capsule over the monorail, deriving the energy from the transmission means.

3. A transportation system comprising: a monorail extending between a plurality of stations and including means for the transmission of energy to any point along the monorail; an automotive vehicle adapted for operation independently of, and apart from any rail system including said monorail; said vehicle including a capsule adapted to carry a pre-selected type and quantity of load, said capsule being detachable from said vehicle and having means for attachment to said monorail for operation thereon, said automotive vehicle being operable as self-propelled vehicle with or without attachment of said capsule, said capsule and the monorail each having means complementing each other for propelling the capsule over the monorail using the energy as transmitted over the transmission means.

4. An automotive vehicle adapted for operation independently of, and apart from any rail system; said vehicle including a capsule adapted to carry a pre-selected type and quantity of load, said vehicle including an engine outside of said capsule so that said vehicle can be operated as a self-propelled vehicle with or without capsule, said capsule being detachable from said vehicle and having means for attachment to a monorail for operation thereon, said capsule furthermore being equipped with means for deriving power from the monorail; and means in said vehicle for raising said capsule from its position in the vehicle to an elevated position for attachment to the monorail.

5. A transportation system comprising: a monorail extending between a plurality of stations and including means for the transmission of energy to any point along the monorail; an automotive vehicle adapted for operation independently of, and apart from any rail system including said monorail; said vehicle including a capsule adapted to carry a pre-selected type and quantity of load, said capsule being detachable from said vehicle and having means for attachment to said monorail for operation thereon, said capsule further including means to operate it independently on said monorail, said automotive vehicle being operable as a self-propelled vehicle with or without attachment of said capsule, said capsule and the monorail each having means complementing each other for propelling the capsule over the monorail using the energy as transmitted over the transmission means.

6. A transportation system comprising: a monorail extending between a plurality of stations and including means for the transmission of energy to any point along the monorail; an automotive vehicle adapted for operation independently of, and apart from any rail system including said monorail; said vehicle including a capsule adapted to carry a pre-selected type and quantity of load, said capsule being detachable from said vehicle and having means for attachment to said monorail for operation thereon, said monorail being provided at pre-selected stations with means to receive the said means for attachment of said capsule, said automotive vehicle being operable as a self-propelled vehicle with or without attachment of said capsule, said capsule and the monorail each having means complementing each other for propelling the capsule over the monorail using the energy as transmitted over the transmission means.

7. A transportation system comprising: a monorail extending between a plurality of stations and including means for the transmission of energy to any point along the monorail; an automotive vehicle adapted for operation independently of, and apart from any rail system including said monorail; said vehicle including a capsule adapted to carry a pre-selected type and quantity of load, said capsule being detachable from said vehicle and having means for attachment to said monorail for operation thereon, and means in said vehicle for raising said capsule from its position in the vehicle to an elevated position for attachment to the monorail, said monorail being provided at pre-selected stations with means to receive the said means for attachment of said capsule, said automotive vehicle being operable as a self-propelled vehicle with or without attachment of said capsule, said capsule and the monorail each having means complementing each other for propelling the capsule over the monorail using the energy as transmitted over the transmission means.

8. A transportation system comprising: a monorail extending between a plurality of stations and including means for the transmission of energy to any point along the monorail; an automotive vehicle adapted for operation independently of, and apart from any rail system including said monorail; said vehicle including a capsule adapted to carry a pre-selected type and quantity of load, said capsule being detachable from said vehicle and having means for attachment to said monorail for operation thereon, said capsule further including means to operate it independently on said monorail, said monorail being provided at pre-selected stations with means to receive the said means for attachment of said capsule, said automotive vehicle being operable as a self-propelled vehicle with or without attachment of said capsule, said capsule and the monorail each having means complementing each other for propelling the capsule over the monorail using the energy as transmitted over the transmission means.

9. A transportation system as set forth in claim 2, the monorail including energizable means defining the stator of a linear motor; the passenger capsules being individually equipped with an armature to complete a linear motor with said energizable means.

10. An automobile having a detachable capsule; means in said automobile to move a suspension system onto the roof of the capsule, said suspension system having means for attachment of the capsule to a monorail; and means in said automobile to lift said capsule from its position on the automobile up into a position permitting attachment of the capsule with suspension system to the monorail.

References Cited

UNITED STATES PATENTS

| | | | |
|---|---|---|---|
| 522,224 | 7/1894 | Lycett | 191—66 |
| 1,656,589 | 1/1928 | Kruckenberg et al. | 104—91 |
| 2,282,352 | 5/1942 | Fitch | 104—172 X |
| 3,118,392 | 1/1964 | Zimmerman | 104—88 |
| 3,225,228 | 12/1965 | Roshala | 104—148 |
| 3,225,704 | 12/1965 | Gilvar et al. | 104—121 |

FOREIGN PATENTS 111,203  8/1940  Australia.

ARTHUR L. LA POINT, *Primary Examiner.*

J. E. BABER, *Assistant Examiner.*